United States Patent
Yamada

(10) Patent No.: US 10,656,928 B2
(45) Date of Patent: May 19, 2020

(54) EXTERNAL RECORDING MEDIUM, MOBILE TERMINAL INCLUDING THE EXTERNAL RECORDING MEDIUM, AND COMMUNICATION CONTROL METHOD

(71) Applicant: GURUNAVI, INC., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 0 days.

(21) Appl. No.: 16/078,450

(22) PCT Filed: Mar. 27, 2017

(86) PCT No.: PCT/IB2017/000307
§ 371 (c)(1),
(2) Date: Aug. 21, 2018

(87) PCT Pub. No.: WO2017/168230
PCT Pub. Date: Oct. 5, 2017

(65) Prior Publication Data
US 2019/0050215 A1     Feb. 14, 2019

(30) Foreign Application Priority Data

Mar. 28, 2016  (JP) .................... 2016-064732
Nov. 30, 2016  (JP) .................... 2016-232732

(51) Int. Cl.
G06F 9/445    (2018.01)
G06F 8/61     (2018.01)
(Continued)

(52) U.S. Cl.
CPC .............. *G06F 8/61* (2013.01); *H04W 76/10* (2018.02); *H04W 8/22* (2013.01); *H04W 76/38* (2018.02); *H04W 84/12* (2013.01); *H04W 88/08* (2013.01)

(58) Field of Classification Search
CPC .................................................. G06F 8/61–65
(Continued)

(56) References Cited

U.S. PATENT DOCUMENTS 6,816,882 B1 * 11/2004 Conner ................. G06F 21/121
                                                            709/203
7,278,163 B2 * 10/2007 Banzhof ............... G06F 21/577
                                                            726/25
(Continued)

FOREIGN PATENT DOCUMENTS

JP     2015-011543 A     1/2015

OTHER PUBLICATIONS

Barrera et al, "Understanding and Improving App Installation Security Mechanisms through Empirical Analysis of Android", ACM, pp. 81-92 (Year: 2012).*
(Continued)

*Primary Examiner* — Anil Khatri
(74) *Attorney, Agent, or Firm* — Sughrue Mion, PLLC

(57) ABSTRACT

An external recording medium (100) that is readable by a mobile terminal (200) stores a program for causing a mobile terminal (200), in which the external recording medium (100) is loaded, to execute an installation step of installing an application and a connection establishing step of, after completion of the installation step, establishing a connection of the mobile terminal (200) with a public line network (300).

11 Claims, 9 Drawing Sheets

(51) Int. Cl.
*H04W 76/10* (2018.01)
*H04W 88/08* (2009.01)
*H04W 84/12* (2009.01)
*H04W 8/22* (2009.01)
*H04W 76/38* (2018.01)

(58) Field of Classification Search
USPC .................................. 717/172–177; 709/203
See application file for complete search history.

(56) References Cited

U.S. PATENT DOCUMENTS

| | | | | |
|---|---|---|---|---|
| 7,430,590 B1* | 9/2008 | Rive | ...................... | H04L 29/06 709/203 |
| 7,526,775 B2* | 4/2009 | Pham | ...................... | G06F 8/61 719/321 |
| 7,689,664 B2* | 3/2010 | Karlberg | ................. | G06F 8/61 709/203 |
| 7,747,999 B1* | 6/2010 | Eng | ........................ | G06F 8/61 370/400 |
| 7,761,883 B2* | 7/2010 | Kasama | .................. | G06F 8/61 717/173 |
| 7,779,085 B2* | 8/2010 | Neil | ....................... | G06F 9/451 709/217 |
| 7,861,242 B2* | 12/2010 | Rygaard | ............... | G06F 9/4856 717/168 |
| 7,898,734 B2* | 3/2011 | Coleman | ............... | G03B 35/16 359/449 |
| 8,225,304 B2* | 7/2012 | Shahindoust | ........... | G06F 8/65 717/172 |
| 8,230,415 B1* | 7/2012 | Thomas | ................. | G06F 21/57 717/168 |
| 8,261,258 B1* | 9/2012 | Jianu | ...................... | G06F 8/61 717/169 |
| 8,261,259 B2* | 9/2012 | Hattori | .................. | G06F 3/1204 708/173 |
| 8,321,858 B1* | 11/2012 | Marmaros | ................ | G06F 8/65 717/173 |
| 8,438,559 B2* | 5/2013 | Naslavsky | ............... | G06F 8/61 717/174 |
| 8,533,708 B2* | 9/2013 | Kamada | ................. | G06F 21/10 717/168 |
| 8,555,273 B1* | 10/2013 | Chia | ...................... | G06F 8/654 717/173 |
| 8,819,659 B2* | 8/2014 | Ramer | ................ | G06F 16/2428 717/168 |
| 8,935,691 B2* | 1/2015 | Ben Ayed | ............ | H04L 67/306 717/169 |
| 9,009,697 B2* | 4/2015 | Breiter | .................. | G06F 9/5072 717/120 |
| 9,015,693 B2* | 4/2015 | Goller | ....................... | G06F 8/65 704/231 |
| 9,398,462 B1* | 7/2016 | Delker | .................. | H04W 12/08 |
| 9,417,866 B2* | 8/2016 | Morley | ..................... | G06F 8/65 |
| 9,785,974 B1* | 10/2017 | Periasamy | ......... | G06Q 30/0267 |

OTHER PUBLICATIONS

Hori et al, "The Challenges of Wireless and Mobile Technologies", ACM, pp. 1-5 (Year: 2004).*
Heiner et al, "Secure Software Installation in a Mobile Environment", ACM, pp. 155-156 (Year: 2007).*
Doukos et al, "Enabling Indoor Exhibition Automated Guidance and Multimedia Content Delivery on Mobile Devices", ACM, pp. 128-132 (Year: 2008).*
Zhao et al, "The Design of Heterogeneous Multi-core Reconfigurable Mobile Terminal Architecture" ACM, pp. 1-5 (Year: 2018).*
Jun-jun et al, "Secure Software Download Framework Based on Mobile Trusted Computing", IEEE, pp. 171-176 (Year: 2009).*
International Search Report fpr PCT/IB2017/000307, dated May 23, 2017 (PCT/ISA/210).
Written Opinion of the International Searching Authority for PCT/IB2017/000307, dated May 23, 2017 (PCT/ISA/237).

* cited by examiner

EXTERNAL RECORDING MEDIUM, MOBILE TERMINAL INCLUDING THE EXTERNAL RECORDING MEDIUM, AND COMMUNICATION CONTROL METHOD

CROSS REFERENCE TO RELATED APPLICATIONS

This application is a National Stage of International Application No. PCT/IB2017/000307 filed Mar. 27, 2017, claiming priority based on Japanese Patent Application No. 2016-064732, filed Mar. 28, 2016 and Japanese Patent Application No. 2016-232732 filed Nov. 30, 2016.

BACKGROUND OF THE INVENTION

1. Field of the Invention

The invention relates to an external recording medium, a mobile terminal including the external recording medium, and a communication control method.

2. Description of Related Art

With the proliferation of mobile terminals, applications intended for the mobile terminals are being actively developed and released, and there is tough competition for obtaining users of the applications. Therefore, various means for having users use the applications are examined.

For example, Japanese Patent Application Publication No. 2015-11543 (JP 2015-011543 A) describes a technique for, in order to raise users' motivation for using applications intended for mobile terminals, raising motivation for using applications that have not been used by the users yet by tentatively giving the users compensation for using the applications and having the users get interested in the applications.

SUMMARY OF THE INVENTION

In order to further increase the number of users of applications, it is required to increase opportunities to have the users recognize the applications. In recent years, in light of an increase in tourists who visit Japan from overseas, it has been found that not only existing advertising activities intended for domestic users, but also application proliferation activities intended for tourists were effective. However, the technique described in JP 2015-011543 A requires to know what kind of application a user is using, so it is difficult to prompt, for example, a user, who is a tourist of which the usage of an application is difficult to be known, to use the application.

The invention provides a technique for proliferation of an application intended for a mobile terminal by improving the recognition of the application.

According to a first aspect of the invention, an external recording medium that is readable by a mobile terminal is provided. The external recording medium is configured to store a program for causing the mobile terminal, in which the external recording medium is loaded, to execute an installation step of installing an application and a connection establishing step of, after completion of the installation step, establishing a connection of the mobile terminal with a public line network.

According to a second aspect of the invention, a mobile terminal including the external recording medium is provided.

According to a third aspect of the invention, a communication control method is provided that can be executed by a processor mounted on a mobile terminal in which an external recording medium is loaded. The communication control method may include an installation step of installing an application on the basis of information stored in the external recording medium and a connection establishing step of, after completion of the installation step, establishing the connection of the mobile terminal with a public line network.

According to the aspects of the invention, it is possible to provide a technique for improving the recognition of an application intended for a mobile terminal and proliferating the application.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments for carrying out the invention will be described with reference to the accompanying drawings. Embodiments that will be described below show examples of an embodiment of the invention, and do not limit the scope of the invention.

Overall Configuration

Figure 1:
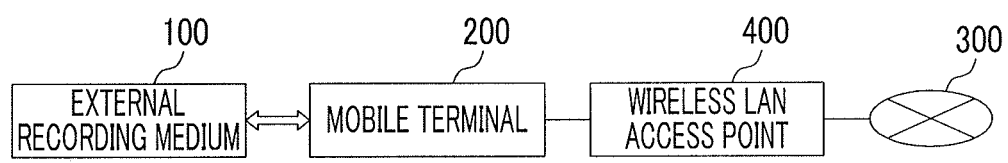
FIG. 1 is a schematic view that shows an example of an overall configuration including an external recording medium and a mobile terminal.

Initially, an overall configuration including an external recording medium 100 and a mobile terminal 200 according to the present embodiments will be described with reference to FIG. 1. As shown in FIG. 1, the external recording medium 100 according to the present embodiments is a medium that is readable by the mobile terminal 200. The external recording medium 100 stores information required to establish a connection of the mobile terminal 200 with a public line network 300. A wireless LAN access point may be interposed between the mobile terminal 200 and the public line network 300. The wireless LAN access point may be installed in an aircraft or a vehicle.

Examples of the external recording medium 100 include a subscriber identification module card (SIM card). The SIM card is a card that stores information that is able to identify a unique ID, such as a phone number. When an appropriate SIM card is inserted in the mobile terminal 200, the mobile terminal 200 allows a phone conversation, communication, or the like, via the public line network 300. Examples of the mobile terminal 200 include a smartphone, a cellular phone, a tablet computer, a personal computer, and the like. The external recording medium 100 is not limited to the one that is insertable into the mobile terminal 200. The external recording medium 100 may be a USB memory, or the like, that is placed in an information readable state when loaded in the mobile terminal 200.

Functional Configuration

Figure 2:
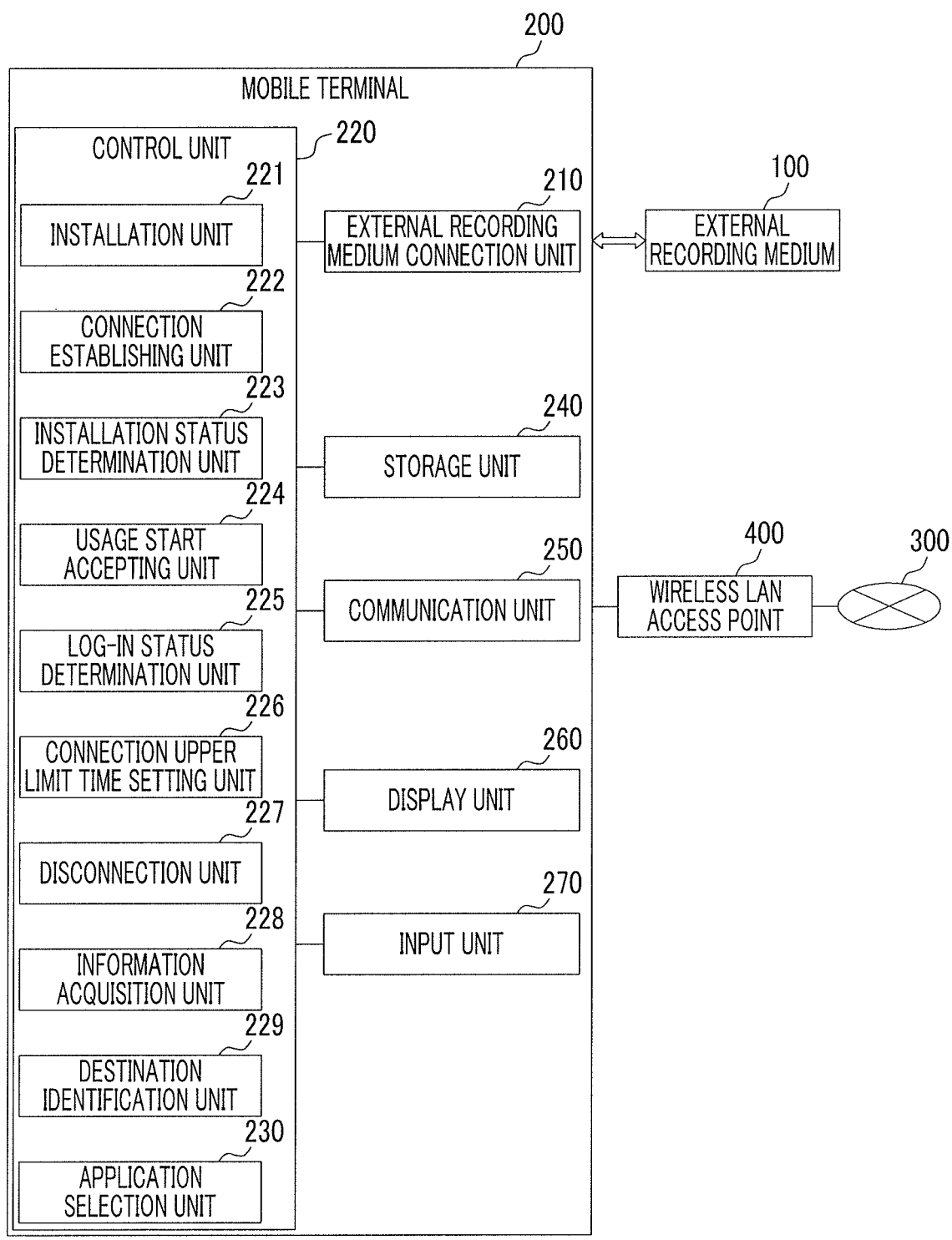
FIG. 2 is a block diagram that shows an example of a functional configuration of each of the external recording medium and the mobile terminal.

Next, the functional configuration of each of the external recording medium 100 and the mobile terminal 200 will be described with reference to FIG. 2. FIG. 2 is a block diagram that shows an example of the functional configuration of each of the external recording medium 100 and the mobile terminal 200.

Information required for the mobile terminal 200 to install an application, a program for installing the application onto the mobile terminal 200 and a program for causing the mobile terminal 200 to establish the connection with the public line network 300 are stored in the external recording medium 100 in a non-transitory manner.

Examples of the information required to install an application include application data, an URL for accessing a server that stores application data, and the like. The mobile terminal 200 is able to install an application by reading application data stored in the external recording medium 100 or accessing the URL stored in the external recording medium 100 to download application data. The number of types of applications stored in the external recording medium 100 may be one or may be two or more. The mobile terminal 200 may be configured as follows. All the pieces of information that should be read by the mobile terminal 200 in order to install an application are stored in the external recording medium 100, and the mobile terminal 200 is able to install the application from the external recording medium 100 without a connection with any network.

Other various programs that are executed by a control unit 220 of the mobile terminal 200 may be stored in the external recording medium 100. The other various programs will be described in detail in the functional configuration of the mobile terminal 200 (described later).

The mobile terminal 200 includes an external recording medium connection unit 210, the control unit 220, a storage unit 240, a communication unit 250, a display unit 260, and an input unit 270.

The external recording medium connection unit 210 communicably connects the external recording medium 100 with the mobile terminal 200. Although not shown in the drawing, for example, when the external recording medium 100 is inserted and loaded in the mobile terminal 200, a connection terminal of the mobile terminal 200 and a connection terminal of the external recording medium 100 contact with each other, with the result that the external recording medium 100 and the mobile terminal 200 are communicably connected to each other.

The control unit 220 includes an arithmetic unit, such as a central processing unit (CPU), and controls various components of the mobile terminal 200. The CPU executes arithmetic processing in accordance with a program in the mobile terminal 200. The arithmetic unit also includes a RAM, and the like. The RAM is used as a temporary storage area (working area) for processing. The control unit 220 reads and executes data, programs, and the like, stored in the external recording medium 100 or the storage unit 240. In the present embodiment, the control unit 220 includes an installation unit 221, a connection establishing unit 222, an installation status determination unit 223, a usage start accepting unit 224, a log-in status determination unit 225, a connection upper limit time setting unit 226, a disconnection unit 227, an information acquisition unit 228, a destination identification unit 229 and an application selection unit 230. Specifically, the control unit 220 serves as the installation unit 221, the connection establishing unit 222, the installation status determination unit 223, the usage start accepting unit 224, the log-in status determination unit 225, the connection upper limit time setting unit 226, the disconnection unit 227, the information acquisition unit 228, the destination identification unit 229, and the application selection unit 230 by executing processing according to various programs.

The storage unit 240 is a nonvolatile storage unit, such as a semiconductor memory, that stores an OS or programs for controlling various functions of the mobile terminal 200, data and programs read from the external recording medium 100, and the like.

The communication unit 250 is a communication interface that carries out communication via the public line network 300 by executing processing according to a predetermined communication protocol. The communication unit 250 also allows the connection with the public line network 300 via the wireless LAN access point 400.

The display unit 260 is a liquid crystal display, a plasma display, or the like, that displays characters, images, and the like. The input unit 270 generates an input signal corresponding to user's input operation, and inputs the generated input signal into the control unit 220. The display unit 260 and the input unit 270 may be separated from each other by providing a display and an operation button in the mobile terminal 200. Alternatively, the display unit 260 and the input unit 270 may be integrated with each other by providing a touch panel in the mobile terminal 200.

The installation unit 221 installs an application by reading data stored in the external recording medium 100. For example, when all the pieces of information that should be read in order to install an application are stored in the external recording medium 100, the installation unit 221 installs the application by reading data from the external recording medium 100. For example, when an URL for accessing a server that stores application data is stored in the external recording medium 100, the external recording medium 100 permits communication between the server and the installation unit 221, and the installation unit 221 installs an application by downloading the data through communication with the server via a network. In this case, communication between the server and the installation unit 221 is permitted by the external recording medium 100. On the other hand, communication for another purpose is not permitted. The connection establishing unit 222 establishes the connection of the mobile terminal 200 with the public line network 300.

The functions of the installation status determination unit 223, usage start accepting unit 224, log-in status determination unit 225, connection upper limit time setting unit 226, and disconnection unit 227 are implemented when the mobile terminal 200 reads various programs stored in the external recording medium 100 and then the control unit 220 executes the various programs. That is, programs required in order to implement the functions as a result of executing processing in various components of the mobile terminal 200 are stored in the external recording medium 100.

The installation status determination unit 223 determines whether the specific application set in advance is installed in the mobile terminal 200. When the application is installed, the usage start accepting unit 224 is allowed to launch the application and accept an operation to start usage of the application from a user who uses the mobile terminal 200. The log-in status determination unit 225 determines whether the user has launched an application on the mobile terminal 200 and has logged in into the application.

When the log-in status determination unit 225 determines that the user has not logged in into the application, the connection upper limit time setting unit 226 sets a connection upper limit time for the connection of the mobile terminal 200 with the public line network 300. The disconnection unit 227 disconnects the mobile terminal 200 from the public line network 300 at the time when an accumulated connection time of the connection of the mobile terminal 200 with the public line network 300 has reached the connection upper limit time.

The connection of the mobile terminal 200 with the public line network 300 may be a connection via a wireless LAN access point installed in an aircraft or a vehicle. The number of types of applications that are stored in the external recording medium 100 is desirably two or more. The information acquisition unit 228 acquires information about the aircraft or the vehicle. The destination identification unit 229 identifies a destination of the aircraft or the vehicle on the basis of the information about the aircraft or the vehicle. The application selection unit 230 selects an application that the installation unit 221 installs from among a plurality of applications in response to the destination.

Operation

Hereinafter, examples of operation of the mobile terminal 200 will be described with reference to FIG. 3 to FIG. 9. Processes according to each of the flowcharts shown in FIG. 3 to FIG. 9 are executed, for example, when the mobile terminal 200 starts communication processing via the public line network 300 in response to user's operation to the mobile terminal 200 or when the control unit 220 of the mobile terminal 200 starts up the power of the mobile terminal 200 in response to user's operation. Other than the above, processes according to each of the flowcharts shown in FIG. 3 to FIG. 9 may be executed at preset timing, that is, for example, when the external recording medium 100 that had not been loaded into the mobile terminal 200 before has been loaded into the mobile terminal 200. The procedure of the processes shown in each of FIG. 3 to FIG. 9 may be partially omitted or the sequence of the processes may be changed.

First Embodiment

Figure 3:
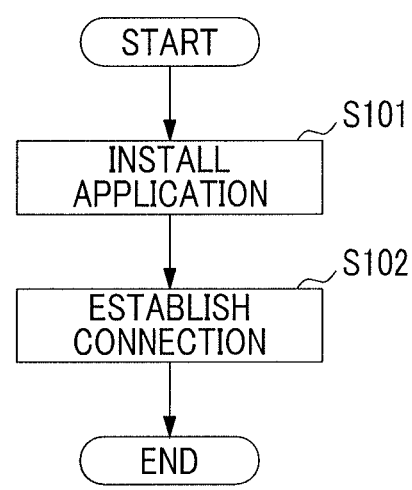
FIG. 3 is a flowchart that shows an example of a procedure that is executed in the mobile terminal according to a first embodiment.

The operation of the mobile terminal 200 according to the first embodiment will be described with reference to FIG. 3. The external recording medium 100 is inserted in the mobile terminal 200. The mobile terminal 200 executes processing in each of the units by reading programs stored in the external recording medium 100.

Initially, the installation unit 221 executes an installation step of installing an application (step S101). After completion of the installation step, the connection establishing unit 222 executes a connection establishing step of establishing a connection with the public line network 300 (step S102). After the connection has been established, the process is ended.

Generally, it is difficult to prompt a user, who is a tourist of which the usage of an application is difficult to be known, to use the application. In contrast, in the present embodiment, an application needs to be installed by inserting the external recording medium 100 into the mobile terminal 200 in order to connect the mobile terminal 200 with the public line network 300, so the user who uses the mobile terminal 200 inevitably recognizes the application. For this reason, an application provider obtains an opportunity to have more users use an application by raising the recognition of the application, and is allowed to proliferate the application. When the external recording medium 100 is not loaded in the mobile terminal 200, the installation step or the connection establishing step is not executed. Therefore, unnecessary processing is not executed in a mobile terminal 200 held by a user other than a user who has intentionally loaded the external recording medium 100 into the mobile terminal 200 used by the user. As a result, for example, memory usage efficiency is improved or high-speed execution of programs is achieved.

With the development of an information communication line network in recent years, there are increased needs of people for using the Internet with the use of their own mobile terminals even when they are overseas. For example, when the external recording medium 100 according to the present embodiment is distributed to tourists from overseas and have the tourists use the external recording medium 100, there is a merit in allowing the tourists to connect with a public line network with the use of their own mobile terminals, and, in the meantime, an application provider is able to have the tourists recognize the application.

In the present embodiment, the type of the application is not specifically limited. Examples of the application include a shop search application with which it is possible to search for a desired shop by specifying a condition. Examples of the shop search application include a restaurant search application.

As for a shop that is searchable with the use of the shop search application, a country or a region is mostly limited to a certain extent, and a marketing activity, such as advertising, is also mostly performed by limiting an intended country or region. For this reason, appealing the shop search application to tourists who come from a country or a region is not usually performed. However, it is possible to have tourists recognize the presence of the shop search application by having the tourists use the external recording medium 100 according to the present embodiment, so it is possible to proliferate the application among a wider range of users.

Second Embodiment

Figure 4:
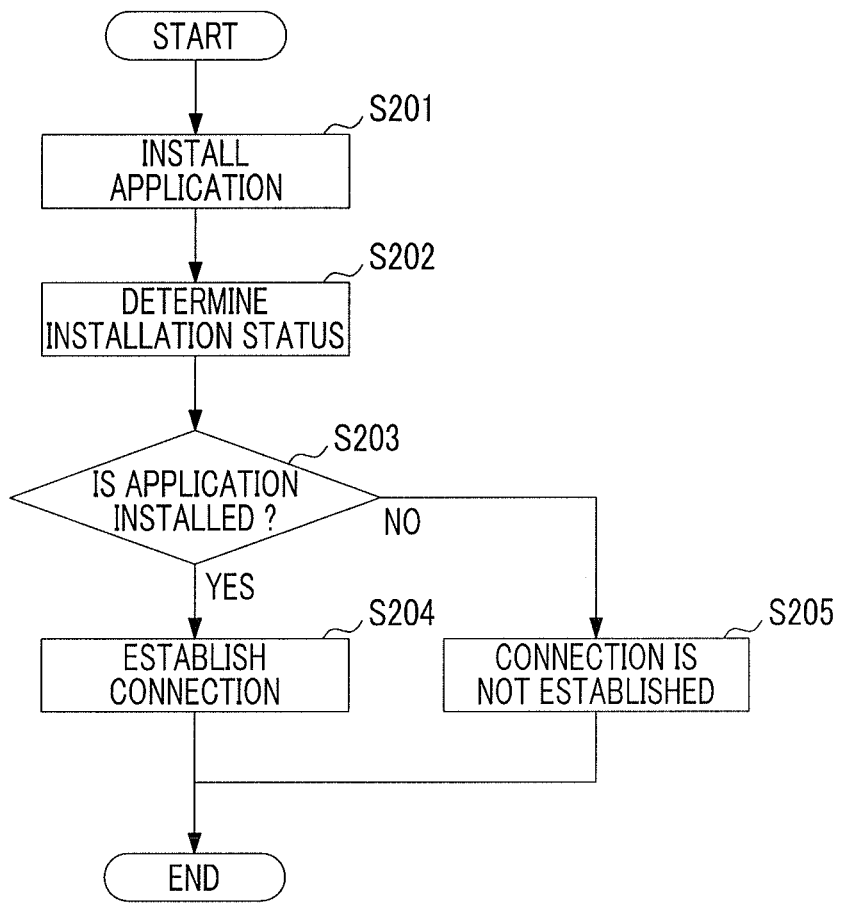
FIG. 4 is a flowchart that shows an example of a procedure that is executed in the mobile terminal according to a second embodiment.

Next, the operation of the mobile terminal 200 according to a second embodiment will be described with reference to FIG. 4. In the following embodiments, differences to the first embodiment will be described. Like reference numerals denote items or steps similar to those of the first embodiment, and the description thereof is omitted.

Initially, the installation unit 221 executes an installation step of installing an application (step S201). After completion of the installation step, the installation status determination unit 223 executes an installation status determination step of determining whether the application is installed in the mobile terminal 200 (step S202), and determines whether the application is installed (step S203). When it is determined that the application is installed (Yes in step S203), the connection establishing unit 222 executes a connection establishing step of establishing a connection of the mobile terminal 200 with the public line network 300 (step S204). After the connection has been established, the process is ended.

On the other hand, when it is determined in the installation status determination step that the application is not installed (No in step S203), the mobile terminal 200 is not connected with the public line network 300 (step S205), after which the process is ended. For example, when the application has been uninstalled from the mobile terminal 200, it is determined that the application is not installed. That is, when the application is not installed, the connection establishing unit 222 restricts the connection of the mobile terminal 200 with the public line network 300.

In the present embodiment, the connection of the mobile terminal 200 with the public line network 300 requires that the application is installed in the mobile terminal 200. If the user uninstalls the application after completion of the installation step, it is not possible to connect the mobile terminal 200 with the public line network 300. Therefore, according to the present embodiment, an opportunity to use an application is increased by preventing the user from uninstalling the application. Thus, it is possible to improve the recognition of the application. When the external recording medium 100 is not loaded in the mobile terminal 200, a step of determining whether the application is installed is not executed. Therefore, unnecessary processing is not executed in a mobile terminal 200 held by a user other than a user who has intentionally loaded the external recording medium 100 into mobile terminal 200 used by the user. As a result, for example, memory usage efficiency is improved or high-speed execution of programs is achieved.

Third Embodiment

Figure 5:
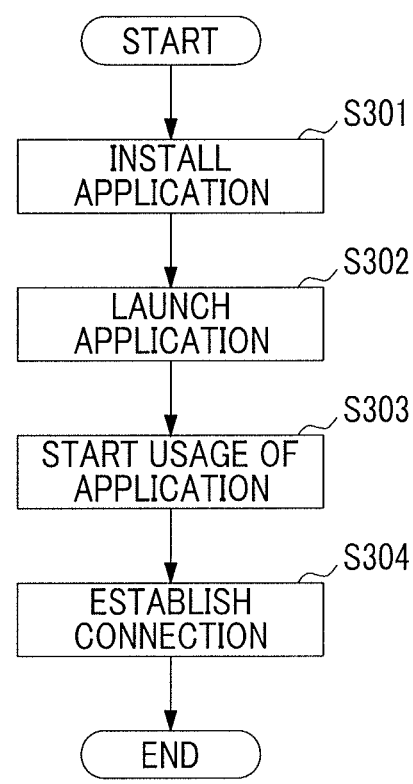
FIG. 5 is a flowchart that shows an example of a procedure that is executed in the mobile terminal according to a third embodiment.

Next, the operation of the mobile terminal 200 according to a third embodiment will be described with reference to FIG. 5.

Initially, the installation unit 221 executes an installation step of installing an application (step S301). After completion of the installation step, the usage start accepting unit 224 launches the application (step S302), and executes a usage start step of accepting a command to start usage of the application from the user (step S303). After completion of the usage start step, the connection establishing unit 222 executes a connection establishing step of establishing a connection with the public line network 300 (step S304). After the connection has been established, the process is ended.

In the present embodiment, a manner of accepting a command to start usage of the application is not specifically limited. For example, a command to start usage of the application may be accepted when the display unit 260 is caused to display an operation button for selecting whether to use the application and then the input unit 270 senses that the operation button for using the application has been selected.

In the present embodiment, the connection of the mobile terminal 200 with the public line network 300 requires that usage of the application is started. It is not possible to connect the mobile terminal 200 with the public line network 300 unless not only the application is installed but also usage of the application is started. Therefore, according to the present embodiment, it is possible to prompt the user to use the application, and it is possible to have the user actually experience the operation of the application.

Fourth Embodiment

Figure 6:
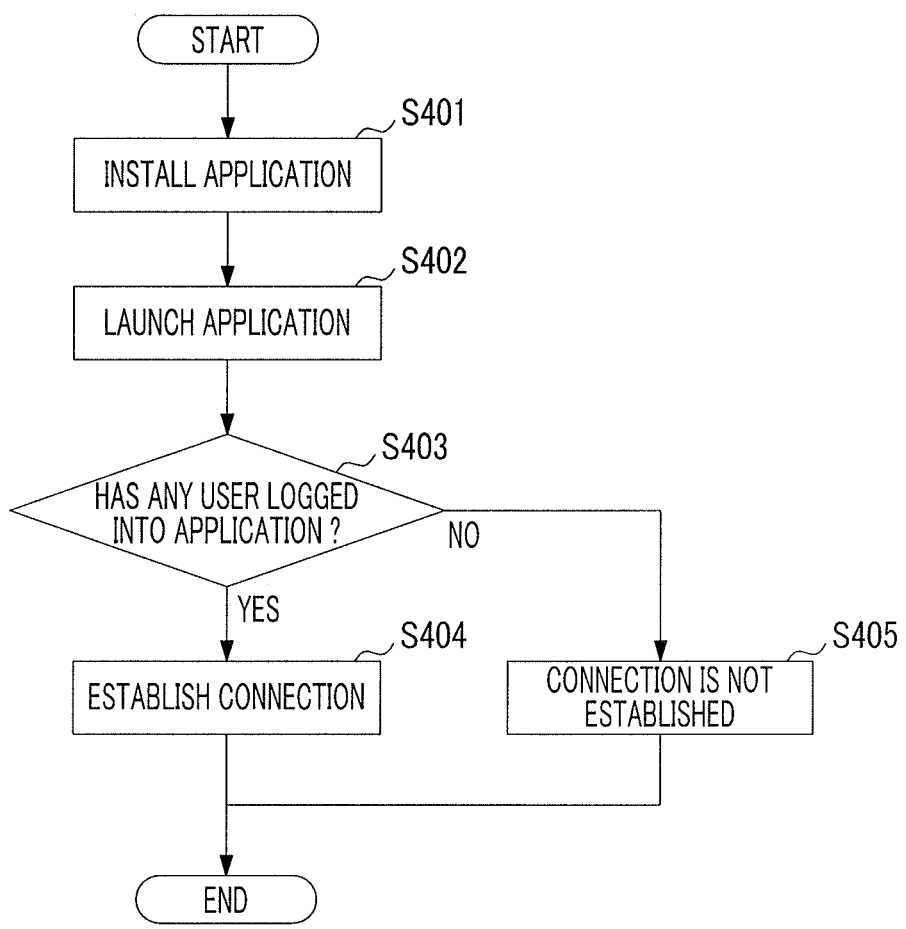
FIG. 6 is a flowchart that shows an example of a procedure that is executed in the mobile terminal according to a fourth embodiment.

Next, the operation of the mobile terminal 200 according to a fourth embodiment will be described with reference to FIG. 6.

Initially, the installation unit 221 executes an installation step of installing an application (step S401). After completion of the installation step, the log-in status determination unit 225 launches the application (step S402), and executes a log-in status determination step of determining whether the user has logged in into the application (step S403). When it is determined that the user has logged in into the application (Yes in step S403), the connection establishing unit 222 executes a connection establishing step of establishing the connection with the public line network 300 (step S404). After the connection has been established, the process is ended.

On the other hand, when it is determined in the log-in status determination step that the user has not logged in into the application, that is, when the user has not logged in into the application (No in step S403), the mobile terminal 200 is not connected with the public line network 300 (step S405), after which the process is ended.

In contrast, in the present embodiment, the connection of the mobile terminal 200 with the public line network 300 requires that the user has logged in into the application. Therefore, it is possible to prompt the user to use the application, and it is possible to have the user actually experience the operation of the application. In the present embodiment, an application provider is allowed to obtain logged-in users, and obtain and store information, such as an access log and a user attribute, associated with log-in information, so it is possible to utilize these pieces of information in order to further improve the recognition of the application.

Fifth Embodiment

Figure 7:
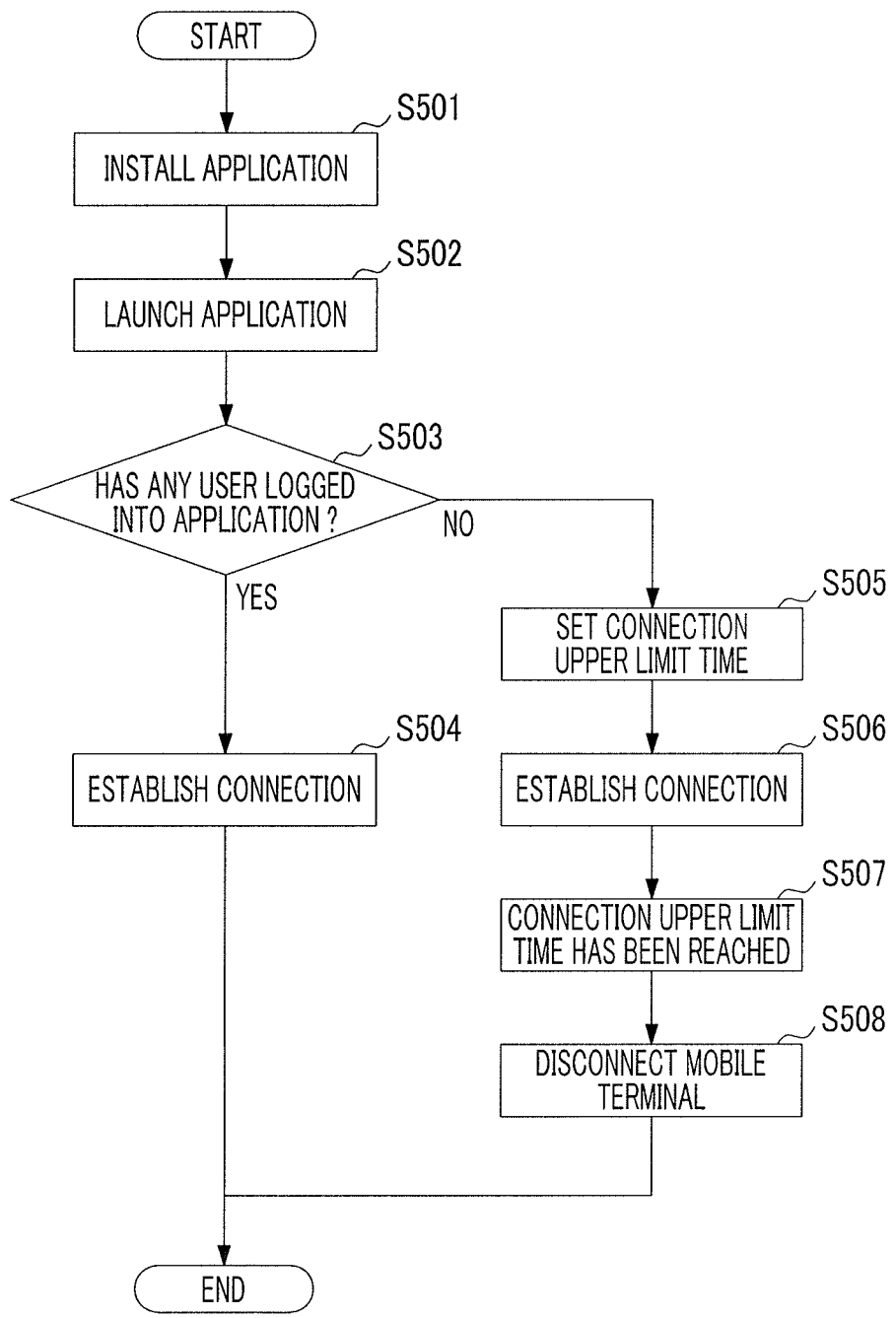
FIG. 7 is a flowchart that shows an example of a procedure that is executed in the mobile terminal according to a fifth embodiment.

Next, the operation of the mobile terminal 200 according to a fifth embodiment will be described with reference to FIG. 7.

Initially, the installation unit 221 executes an installation step of installing an application (step S501). After completion of the installation step, the log-in status determination unit 225 launches the application (step S502), and executes a log-in status determination step of determining whether the user has logged in into the application (step S503). When it is determined that the user has logged in into the application (Yes in step S503), the connection establishing unit 222 executes a connection establishing step of establishing a connection with the public line network 300 (step S504). After the connection has been established, the process is ended.

On the other hand, when it is determined in the log-in status determination step that the user has not logged in into the application, that is, when the user has not logged in into the application (No in step S503), the connection upper limit time setting unit 226 executes a connection upper limit time setting step of setting a connection upper limit time for the connection of the mobile terminal 200 with the public line network 300 (step S505). After that, the connection establishing unit 222 executes a connection establishing step of establishing the connection with the public line network 300 (step S506). The disconnection unit 227 accumulates a connection time of the connection of the mobile terminal 200 with the public line network 300. As the total connection time reaches the connection upper limit time (step S507), the disconnection unit 227 executes a disconnection step of disconnecting the mobile terminal 200 from the public line network 300 (step S508), after which the process is ended.

In the above-described fourth embodiment, it is not possible to connect the mobile terminal 200 with the public line network 300 unless the user logs in into the application; whereas, in the present embodiment, it is possible to connect the mobile terminal 200 with the public line network 300 even when the user does not log in into the application. However, in the present embodiment, an upper limit is set on a connection time when the user does not log in into the application, and the mobile terminal 200 is disconnected from the public line network 300 as the connection time reaches the connection upper limit time. With this configuration, it is possible to give motivation of the user who uses the mobile terminal 200 for logging in into the application, so it is possible to increase the number of logged-in users.

In the first to fifth embodiments described in detail above, the connection with the public line network 300 may be a connection via a wireless LAN access point, and the wireless LAN access point may be installed in an aircraft or a vehicle. The aircraft is not specifically limited as long as the aircraft is a device that travels in the air with people aboard. Examples of the aircraft include an airplane, a helicopter, an airship, a glider, and the like. The vehicle is not specifically limited as long as the vehicle is a vehicle with wheels. Examples of the vehicle include a rolling stock, a steam train, an automobile, and the like.

Sixth Embodiment

Figure 8:
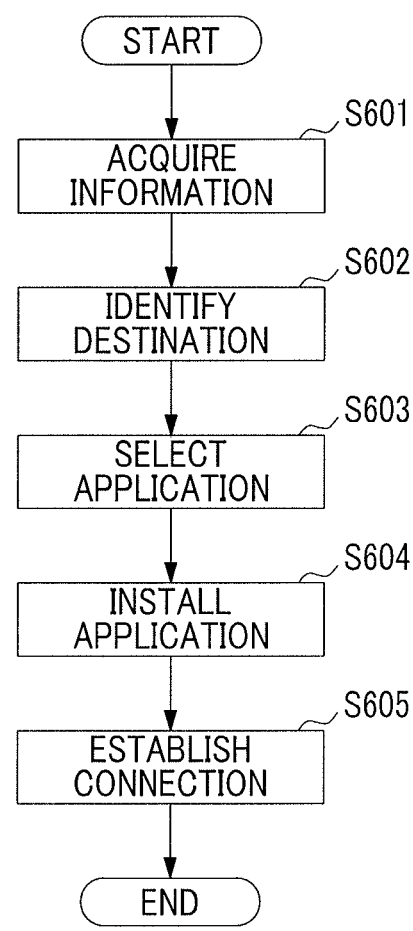
FIG. 8 is a flowchart that shows an example of a procedure that is executed in the mobile terminal according to a sixth embodiment.

Next, the operation of the mobile terminal 200 according to a sixth embodiment will be described with reference to FIG. 8. In the present embodiment, a user who uses the mobile terminal 200 is boarding on an aircraft or a vehicle in which a wireless LAN access point is installed, and the mobile terminal 200 connects with the public line network 300 via the wireless LAN access point. Information about two types or more applications is stored in the external recording medium 100.

Initially, the information acquisition unit 228 executes an information acquisition step of acquiring the information about the aircraft or the vehicle via the wireless LAN access point installed in the aircraft or the vehicle (step S601). The destination identification unit 229 executes a destination identification step of identifying a destination of the aircraft or vehicle on the basis of the information about the aircraft or the vehicle (step S602). The application selection unit 230 executes an application selection step of selecting an application that the installation unit 221 installs in response to the destination identified by the destination identification unit 229 (step S603). The installation unit 221 executes an installation step of installing the application selected by the application selection unit 230 (step S604). After completion of the installation step, the connection establishing unit 222 executes a connection establishing step of establishing a connection with the public line network 300 (step S605). After the connection has been established, the process is ended.

The information about the aircraft or the vehicle, which the information acquisition unit 228 acquires via the wireless LAN access point, contains information on the basis of which it is possible to identify the destination of the aircraft or vehicle. Examples of the information on the basis of which it is possible to identify the destination of the aircraft or vehicle include information regarding a combination of the flight number of the aircraft or the train number with a date.

Examples of the destination of the aircraft or vehicle include the name of an arrival airport or station, the name of a region or country in which an arrival airport or station is present, and the like.

Seventh Embodiment

Figure 9:
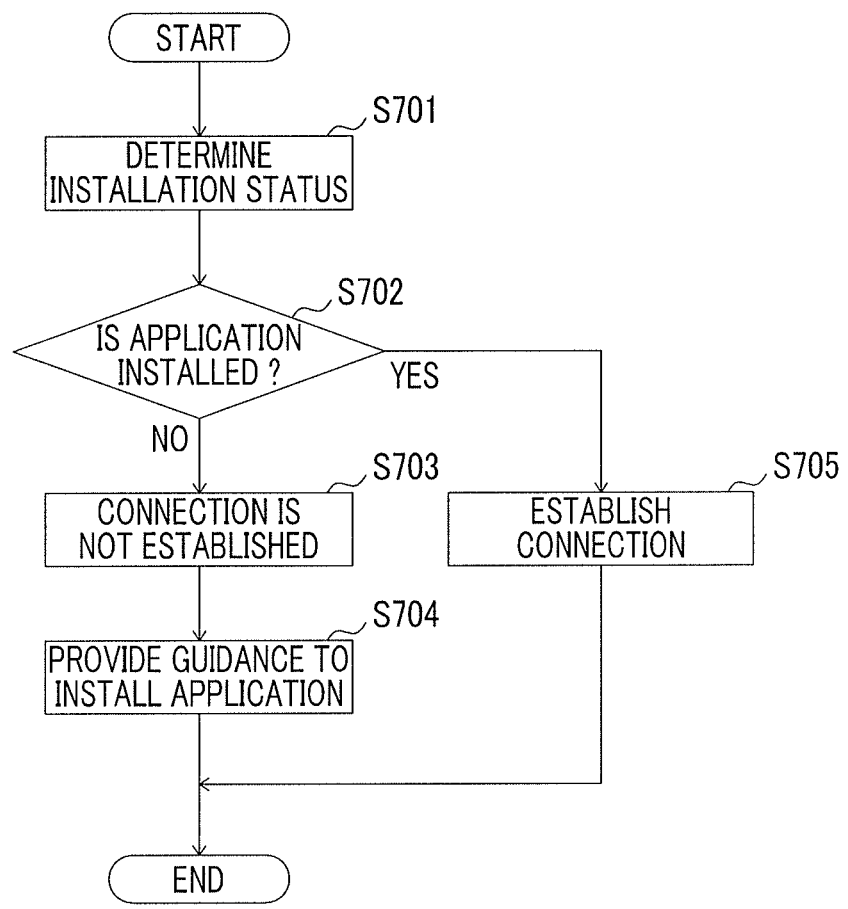
FIG. 9 is a flowchart that shows an example of a procedure that is executed in the mobile terminal according to a seventh embodiment.

Next, the operation of the mobile terminal 200 according to a seventh embodiment will be described with reference to FIG. 9.

Initially, the installation status determination unit 223 executes an installation status determination step of determining whether the application is installed in the mobile terminal 200 (step S701), and determines whether the application is installed (step S702). When it is determined that the application is installed (Yes in step S702), the connection establishing unit 222 executes a connection establishing step of establishing a connection with the public line network 300 (step S705). After the connection has been established, the process is ended.

On the other hand, when it is determined that the application is not installed (No in step S702), the connection establishing unit 222 does not establish the connection with the public line network 300 (step S703), and provides a notice of guidance for prompting the user to install the application (step S704), after which the process is ended. Thus, the user can understand the necessity of installation of the application in order to connect the mobile terminal 200 with the public line network 300. After the application has been installed, the processes shown in FIG. 9 are started again, and it is determined in step S702 that the application is installed (step S702), with the result that communication with the public line network 300 is established.

Hereinafter, an example in which an application to be installed into the mobile terminal 200 is a shop search application and applications of different types by regions in which shops are present are stored in the external recording medium 100 in the present embodiment will be described.

Two types of shop search applications, that is, an A region-oriented shop search application and a B region-oriented shop search application, are stored in the external recording medium 100. Shops present in the A region are stored in the A region-oriented shop search application. Shops present in the B region are stored in the B region-oriented shop search application. When the destination identified by the destination identification unit 229 of the mobile terminal 200 is the A region, the application selection unit 230 selects the A region-oriented shop search application from among the two types of applications stored in the external recording medium 100.

In the present embodiment, since the application corresponding to the destination of the aircraft or vehicle on which the user is boarding is selected and then the user is caused to install the selected application into the mobile terminal 200, it is possible to raise the possibility of usage of the application continuously even after the user has reached the destination.

An application provider is, for example, able to distribute the external recording medium 100 according to the present embodiment to a user before boarding on an airplane or a user boarding on an airplane. When processing according to the present embodiment is executed as the user boarding on an airplane inserts the external recording medium 100 into the mobile terminal 200, the connection with the public line network 300 is established through satellite communication via the wireless LAN access point installed in the airplane.

For example, in order to get new users of an A country-oriented application, conventionally, an appeal intended for users in the A country is generally performed. However, it is held that, in order to further get users of the A country-oriented application, it is effective to promote the application also to tourists who come to visit the A country and have the tourists use the application. For example, by distributing the external recording medium 100 that stores the A country-oriented application to B country people boarding on an A country-bound airplane and having the B country people use the application, it is possible to promote the A country-oriented application to the B country people. By having the B country people continuously use the A country-oriented application after arrival of the A country, it is possible to proliferate the application.

The embodiments of the invention are described in detail above; however, the invention also encompasses a mobile terminal in which the external recording medium according to the above-described embodiments is inserted. As described with reference to FIG. 3 to FIG. 9, the invention may be regarded as the invention of a communication control method including a plurality of steps that are executed in a mobile terminal.

The above-described plurality of embodiments may be implemented in combination within the range in which there is no contradiction in the configuration and operation thereof. For example, a combination of the second embodiment, the third embodiment, the fourth embodiment or the fifth embodiment with the sixth embodiment may be implemented. In this case, before the installation step of the second embodiment (FIG. 4), the third embodiment (FIG. 5), the fourth embodiment (FIG. 6) or the fifth embodiment (FIG. 7), the information acquisition step, the destination identification step and the application selection step of the sixth embodiment (FIG. 8) should be executed.

An external recording medium (100) that is readable by a mobile terminal (200) stores a program for causing a mobile terminal (200), in which the external recording medium (100) is loaded, to execute an installation step of installing an application and a connection establishing step of, after completion of the installation step, establishing a connection of the mobile terminal (200) with a public line network (300).

The invention claimed is:

1. An external recording medium that is readable by a mobile terminal, the external recording medium storing:
 a program for causing the mobile terminal, in which the external recording medium is loaded, to execute:
 an installation step of installing an application, and
 a connection establishing step of, after completion of the installation step, establishing connection of the mobile terminal with a public line network,
 wherein the external recording medium further stores:
 a program for causing the mobile terminal to execute a log-in status determination step of determining whether a user of the mobile terminal has logged into the application;
 a program for, only when it is determined in the log-in status determination step that the user has logged into the application, causing the mobile terminal to execute the connection establishing step;
 a program for causing the mobile terminal to execute an installation status determination step of determining whether the application is installed;
 a program for, when it is determined in the installation status determination step that the application is installed, causing the mobile terminal to execute the connection establishing step; and
 a program for, when it is determined in the installation status determination step that the application is not installed, causing the mobile terminal to provide a notice of guidance for prompting a user of the mobile terminal to install the application.

2. The external recording medium according to claim 1, wherein the external recording medium further stores:
 a program for causing the mobile terminal to execute a usage start step of accepting a command to start usage of the application; and
 a program for, when the usage start step has been executed, causing the mobile terminal to execute the connection establishing step.

3. The external recording medium according to claim 1, wherein the external recording medium further stores:
 a program for, when it is determined in the log-in status determination step that the user has not logged into the application, causing the mobile terminal to execute:
 a connection upper limit time setting step of, before the connection establishing step, setting a connection upper limit time of connection of the mobile terminal with the public line network, and
 a disconnection step of, after the connection establishing step, at the time when a connection time of connection of the mobile terminal with the public line network has reached the connection upper limit time, disconnecting the mobile terminal from the public line network.

4. The external recording medium according to claim 1, wherein
 connection of the mobile terminal with the public line network is connection via a wireless LAN access point installed in an aircraft or a vehicle.

5. The external recording medium according to claim 4, wherein the external recording medium further stores:
 a program for causing the mobile terminal to execute
 an information acquisition step of, before the installation step, acquiring information about the aircraft or the vehicle via the wireless LAN access point installed in the aircraft or the vehicle, and
 a destination identification step of identifying a destination of the aircraft or the vehicle on the basis of the information about the aircraft or the vehicle, and
 an application selection step of selecting an application to be installed into the mobile terminal in the installation step in response to the destination; and
 a program for causing the mobile terminal to execute the installation step of installing the application selected in the application selection step.

6. The external recording medium according to claim 1, wherein the external recording medium further stores:
 a program for, in the installation step, permitting communication between the mobile terminal and an external server and causing the mobile terminal to download data stored in the external server.

7. A mobile terminal comprising:
 the external recording medium according to claim 1.

8. A communication control method that is executed by a processor mounted on a mobile terminal in which an external recording medium is loaded, the communication control method comprising:
 an installation step of installing an application on the basis of information stored in the external recording medium; and a connection establishing step of, after completion of the installation step, establishing connection of the mobile terminal with a public line network, wherein the external recording medium further stores:

a program for causing the mobile terminal to execute a log-in status determination step of determining whether a user of the mobile terminal has logged into the application; and a program for, only when it is determined in the log-in status determination step that the user has logged into the application, causing the mobile terminal to execute the connection establishing step;

a program for causing the mobile terminal to execute an installation status determination step of determining whether the application is installed;

a program for, when it is determined in the installation status determination step that the application is installed, causing the mobile terminal to execute the connection establishing step; and a program for, when it is determined in the installation status determination step that the application is not installed, causing the mobile terminal to provide a notice of guidance for prompting a user of the mobile terminal to install the application.

9. An external recording medium that is readable by a mobile terminal, the external recording medium storing:

a program for causing the mobile terminal, in which the external recording medium is loaded, to execute:

an installation step of installing an application, and a connection establishing step of, after completion of the installation step, establishing connection of the mobile terminal with a public line network, wherein the installation step further comprises the external recording medium causing an installation unit of the mobile terminal to access information stored in the external recording medium, for installing the application, and wherein the external recording medium allows a communication between an application server and the mobile terminal, and wherein the external recording medium further comprises:

a program for causing the mobile terminal to execute an installation status determination step of determining whether the application is installed;

a program for, when it is determined in the installation status determination step that the application is installed, causing the mobile terminal to execute the connection establishing step; and a program for, when it is determined in the installation status determination step that the application is not installed, causing the mobile terminal to provide a notice of guidance for prompting a user of the mobile terminal to install the application.

10. A communication control method that is executed by a processor mounted on a mobile terminal in which an external recording medium is loaded, the communication control method comprising:

an installation step of installing an application on the basis of information stored in the external recording medium; and a connection establishing step of, after completion of the installation step, establishing connection of the mobile terminal with a public line network, wherein the installation step further comprises the external recording medium causing an installation unit of the mobile terminal to access information stored in the external recording medium, for installing the application, wherein the external recording medium allows a communication between an application server and the mobile terminal, and wherein the method further comprises:

an installation status determination step of determining whether the application is installed;

when it is determined in the installation status determination step that the application is installed, executing the connection establishing step; and when it is determined in the installation status determination step that the application is not installed, providing a notice of guidance for prompting a user of the mobile terminal to install the application.

11. A mobile terminal comprising:

a processor configured to load a program stored in an external recording medium and perform:

an installation step of installing an application on the basis of information stored in the external recording medium; and a connection establishing step of, after completion of the installation step, establishing connection of the mobile terminal with a public line network, wherein the installation step further comprises the external recording medium causing an installation unit of the mobile terminal to access information stored in the external recording medium, for installing the application, and wherein the external recording medium allows a communication between an application server and the mobile terminal, and wherein the processor is further configured to:

execute an installation status determination step of determining whether the application is installed;

when it is determined in the installation status determination step that the application is installed, cause the processor to execute the connection establishing step; and when it is determined in the installation status determination step that the application is not installed, cause the processor to provide a notice of guidance for prompting a user of the mobile terminal to install the application.

* * * * *